US010880110B2

(12) United States Patent
Lyons

(10) Patent No.: US 10,880,110 B2
(45) Date of Patent: Dec. 29, 2020

(54) APPARATUS AND METHOD FOR IDENTIFYING OBJECTS USING SOCIAL LINKS

(71) Applicant: Nokia Technologies Oy, Espoo (FI)

(72) Inventor: Kenton Lyons, Santa Clara, CA (US)

(73) Assignee: Nokia Technologies Oy, Espoo (FI)

( * ) Notice: Subject to any disclaimer, the term of this patent is extended or adjusted under 35 U.S.C. 154(b) by 99 days.

(21) Appl. No.: 14/060,389

(22) Filed: Oct. 22, 2013

(65) Prior Publication Data
US 2015/0113059 A1  Apr. 23, 2015

(51) Int. Cl.
| H04L 12/18 | (2006.01) |
| G06Q 50/00 | (2012.01) |
| G06Q 10/10 | (2012.01) |
| H04L 29/08 | (2006.01) |
| H04L 12/24 | (2006.01) |

(52) U.S. Cl.
CPC ......... *H04L 12/1813* (2013.01); *G06Q 10/10* (2013.01); *G06Q 50/01* (2013.01); *H04L 41/28* (2013.01); *H04L 67/12* (2013.01)

(58) Field of Classification Search
CPC ............... G06F 3/04842; G06Q 50/01; G06Q 30/0269; G06Q 30/0267; G06Q 30/0643; G06Q 10/10; H04L 51/32; H04L 65/403; H04L 67/22; H04L 12/588; H04L 67/306; H04L 51/36; H04L 63/105; H04L 12/1813; H04L 67/12; H04L 41/28; G01C 21/3682
USPC .......................... 709/204; 715/753, 764, 744
See application file for complete search history.

(56) References Cited

U.S. PATENT DOCUMENTS

| 9,479,488 B2* | 10/2016 | Tseng .................... H04L 63/102 |
| 10,284,541 B1* | 5/2019 | Subramanian ........ H04L 67/306 |
| 2005/0165785 A1* | 7/2005 | Malkin ................... H04L 67/16 |
| 2009/0228486 A1* | 9/2009 | Kuehr-McLaren ........................ H04L 63/101 |

(Continued)

FOREIGN PATENT DOCUMENTS

| WO | WO 2013/009546 A1 | 1/2013 |
| WO | 2013/051009 A2 | 4/2013 |
| WO | WO 2013/145518 A1 | 10/2013 |

OTHER PUBLICATIONS

J. Hong and M. Baker, "What's New in the Ubicomp Community?," in IEEE Pervasive Computing, vol. 12, No. 1, pp. 5-7, Jan.-Mar. 2013. (Year: 2013).*
Liang et al., "GeoCENS: Geospatial Cyberinfrastructure for Environmental Sensing", GIScience, Sep. 2010, 7 pages.

(Continued)

*Primary Examiner* — Alina A Boutah
(74) *Attorney, Agent, or Firm* — Alston & Bird LLP

(57) ABSTRACT

Mechanisms are described for identifying objects based on a social context of the object. In other words, objects, such as devices, systems, and physical objects that are configured to communicate data on a network, that are accessible to a user may be identified via the user's social links. In particular, a social link associated with a user of a device may be accessed, and an object may be identified using the social link, where the object is connected to a network. Presentation of an indication of the object, such as a marker, an identifier, a hyperlink, etc., may be provided for using the display of the user's device. In this way, a user may be able to see, and in some cases use or manipulate, objects that are owned by parties with whom the user has a social connection and to which the party has granted the user certain permissions.

21 Claims, 9 Drawing Sheets

(56) References Cited

U.S. PATENT DOCUMENTS

| | | | | |
|---|---|---|---|---|
| 2009/0281719 A1* | 11/2009 | Jakobson | ............ | G01C 21/3682 701/439 |
| 2010/0325686 A1 | 12/2010 | Davis et al. | | |
| 2011/0022967 A1* | 1/2011 | Vijayakumar | ....... | G06Q 10/107 715/753 |
| 2011/0161478 A1* | 6/2011 | Formo | .................. | H04L 67/306 709/223 |
| 2011/0258303 A1* | 10/2011 | Nath | ....................... | G06F 9/468 709/223 |
| 2012/0023332 A1* | 1/2012 | Gorodyansky | ....... | H04L 63/105 713/168 |
| 2012/0216244 A1 | 8/2012 | Kumar et al. | | |
| 2013/0007126 A1* | 1/2013 | Ziemann | ................ | G06Q 50/01 709/204 |
| 2013/0067597 A1 | 3/2013 | Choi et al. | | |
| 2013/0091280 A1 | 4/2013 | Rajakarunanayake et al. | | |
| 2013/0097517 A1* | 4/2013 | Reiss | ...................... | G06F 21/54 715/741 |
| 2013/0174277 A1* | 7/2013 | Kiukkonen | ............ | H04L 63/104 726/28 |
| 2013/0185426 A1* | 7/2013 | Chevillat | ............... | G06Q 50/01 709/225 |
| 2013/0282806 A1* | 10/2013 | Steinberg | ............... | G06Q 50/01 709/204 |
| 2014/0019240 A1* | 1/2014 | Zhou | .................. | G06Q 30/0269 705/14.53 |
| 2015/0249645 A1* | 9/2015 | Sobel | ................. | H04L 63/0807 726/12 |

OTHER PUBLICATIONS

Breslin et al., "Integrating Social Networks and Sensor Networks", W3C Workshop on the Future of Social Networking, Jan. 15-16, 2009, pp. 1-5.
International Search Report and Written Opinion received for corresponding Patent Cooperation Treaty Application No. PCT/FI2014/050797, dated Jan. 29, 2015, 9 pages.
Office Action for Japanese Patent Application No. 2016-525588, dated Jun. 23, 2017, 9 pages.
Office Action for Japanese Patent Application No. 2016-525588, dated Mar. 13, 2018, 2 pages.
Office Action for European Application No. 14796794.7 dated Aug. 2, 2018.
Office Action for Philippine Application No. 1/2016/500721 dated Jul. 30, 2018.
Office Action for Chinese Application No. 2014800580467 dated Mar. 27, 2019.
Summons to attend Oral Proceedings for European Application No. 147396794.7 dated Apr. 29, 2019.
Office Action for Chinese Application No. 2014800580467 dated Jul. 15, 2019.
European Patent Office, Decision to Refuse Application No. 14796794.7, dated Dec. 17, 2019, 40 pages, Netherlands.
Intellectual Property Office of India, Office Action received for Application No. 201647016953, dated Dec. 3, 2020, 9 pages, India.
Intellectual Property Office of the Philippines Bureau of Patents, Office Action received for Application No. 1/2016/500721, dated Mar. 6, 2020, 4 pages, Philippines.
Office Action for Philippines Application No. 1/2016/500721 dated Aug. 27, 2020.

* cited by examiner

APPARATUS AND METHOD FOR IDENTIFYING OBJECTS USING SOCIAL LINKS

TECHNOLOGICAL FIELD

Example embodiments of the present invention relate generally to facilitating the identification of objects connected to a network, such as the Internet of Things.

BACKGROUND

As more and more objects are becoming "smart," the idea of a globally interconnected network of devices, objects, and things (sometimes called the Internet of Things) is moving closer to becoming a reality. From cellular phones to motion sensors, lamps to refrigerators, pollution sensors to shoes, every object that exists can potentially be assigned a unique identifier and can be configured to communicate with other devices via a network. As the number of "smart" objects grows, however, so too does the burden on a user to identify a particular object belonging to the user himself or to some other user for gaining access to that object.

BRIEF SUMMARY OF EXAMPLE EMBODIMENTS

Accordingly, it may be desirable to provide tools that allow users to easily and intuitively discover and access other "smart" objects using social links. Embodiments of an apparatus, method, and computer program product are thus described that can identify an object that is connected to a network using a social link between a user of a device and a party who is related to the user, where the party is the owner of the object. In this way, embodiments of the invention are configured to leverage an explicit or implicit social network of individuals and the devices or objects they control.

In some embodiments, an apparatus may be provided that includes at least one processor and at least one memory including computer program code. The at least one memory and the computer program code may be configured to, with the processor, cause the apparatus to at least access a social link associated with a user of a device, identify an object via the social link, where the object is connected to a network, and provide for presentation of an indication of the object on a display of the device.

The at least one memory and the computer program code may be configured to, with the processor, cause the apparatus to access the social link automatically in response to the user's execution of a third party application. Alternatively or additionally, the at least one memory and the computer program code may be configured to, with the processor, cause the apparatus to access the social link via a social networking interface. The at least one memory and the computer program code may be configured to, with the processor, cause the apparatus to identify the object by determining a party related to the user via the social link and identifying at least one object associated with the party. In some cases, the at least one memory and the computer program code may be configured to, with the processor, cause the apparatus to identify the object by determining whether access control information associated with the object allows for access of the object by the user of the device.

In some embodiments, the at least one memory and the computer program code may be configured to, with the processor, cause the apparatus to provide for presentation of the indication by providing for presentation of a visual representation of the object. Alternatively or additionally, the at least one memory and the computer program code may be configured to, with the processor, cause the apparatus to provide for presentation of the indication by providing for presentation of data associated with the object. Moreover, the at least one memory and the computer program code may be configured to, with the processor, cause the apparatus to provide for presentation of the indication by enabling control of the object by the user of the device. The at least one memory and the computer program code may be configured to, with the processor, cause the apparatus to receive data associated with the object in response to receipt of user input via the indication presented in some cases.

In other embodiments, a method and a computer program product are described for accessing a social link associated with a user of a device; identifying an object via the social link, wherein the object is connected to a network; and providing for presentation of an indication of the object on a display of the device. In some cases, the social link may be accessed automatically in response to the user's execution of a third party application or via a social networking interface. Moreover, a determination of whether access control information associated with the object allows for access of the object by the user of the device may be made. Additionally or alternatively, the method and computer program product may provide for presentation of at least one of a visual representation of the object or data associated with the object. In some cases, control of the object by the user of the device may be enabled, and/or data associated with the object may be received in response to receipt of user input via the indication presented.

In still other embodiments, an apparatus is described for identifying objects based on a social context of the object. The apparatus includes means for accessing a social link associated with a user of a device; means for identifying an object via the social link, wherein the object is connected to a network; and means for providing for presentation of an indication of the object on a display of the device.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1:
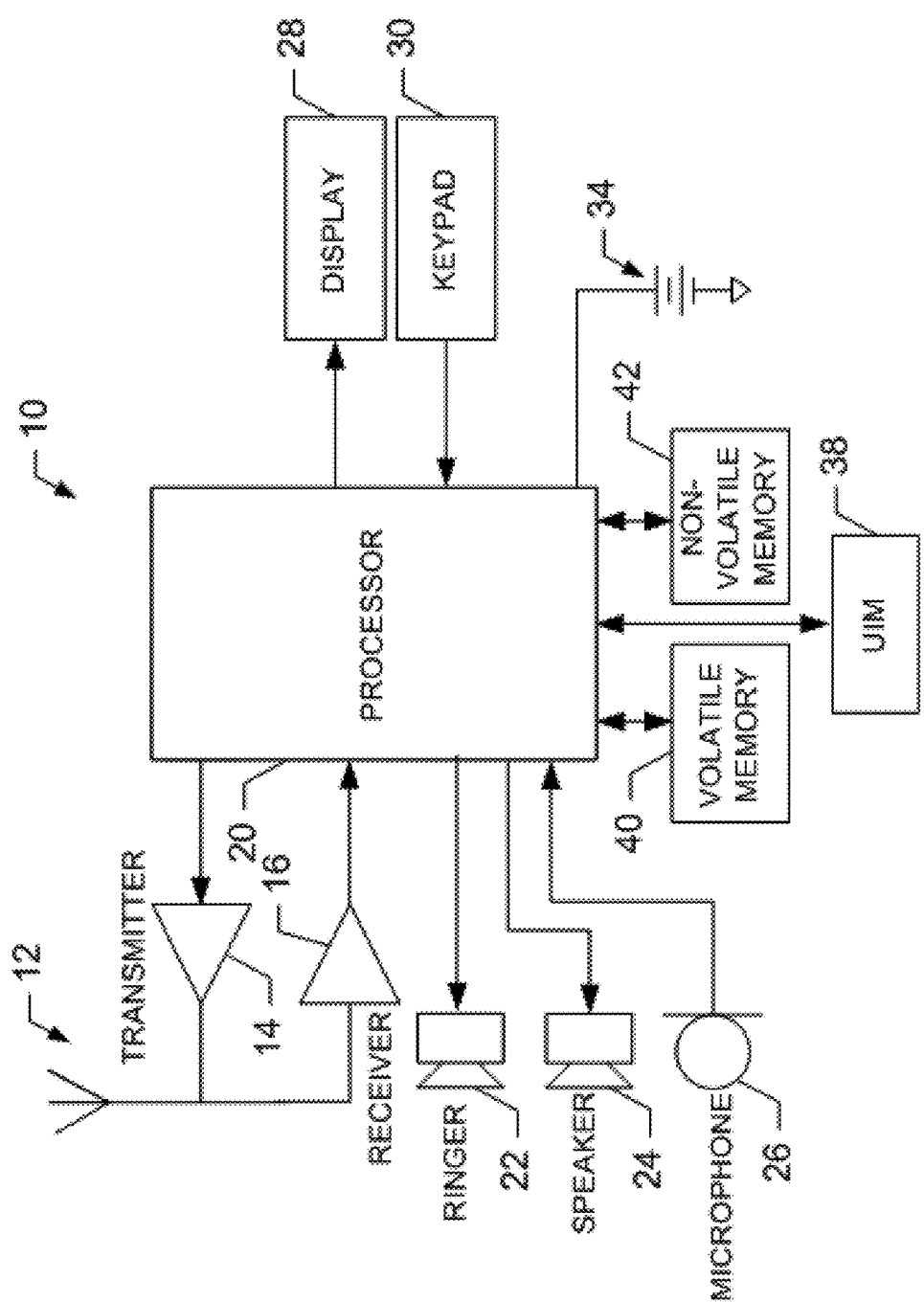
FIG. 1 illustrates one example of a communication system according to an example embodiment of the present invention.

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, any object can be connected to a network of objects (often referred to as the Internet of Things, or IoT) by equipping the object with a unique identifier, such as via a radio frequency identification (RFID) tag or using other techniques that can enable the object to be managed and inventoried by a computer, including near field communication (NFC) identifiers, barcodes, Quick Response (QR) codes, digital watermarks, etc. In conventional systems, discovery and access control mechanisms (e.g., the mechanisms used to identify the objects that are connected to the network and which other devices or objects are allowed access to those objects) are object-centric. In other words, the object identifier that is visible to a user seeking access to that object relates to a characteristic of the object, such as a media access control (MAC) address, an access point name, or a universally unique identifier (UUID), to a name a few. To the typical user, however, such identifiers are difficult to mentally associate with a physical object (such as the light fixture in the user's driveway or a temperature sensor in the user's lab).

Using a conventional example, a user's mobile device (e.g., a smart phone) may, in response to a request by the user, scan a wireless network for access points. In this example, an access point may be a device that allows wireless devices to connect to a wired network using Wi-Fi or other standards. The access point name (APN) typically includes a network identifier portion and may optionally include an operator identifier portion. Thus, an example of such a two-part APN may be, for instance, internet.mnc023.mcc345.gprs. The APN for an identified access point may, thus, be meaningless to a user as not readily or intuitively identifying the particular object that the APN is meant to identify.

As another example, a conventional mobile device, such as a smart phone may be configured to identify other smart phones within a certain proximity to the user's smart phone where such proximity detection is allowed by a user of the respective smart phones in the area. The phones may be identifiable using an International Mobile Equipment Identity (IMEI) number, which is a unique number that is assigned to each mobile telephone. Again, the IMEI number, which takes the form of a 15-digit number grouped in four groups (e.g., 12345-66-777888-9) cannot readily be associated by a user with the particular device that it identifies.

Accordingly, example embodiments of the present invention provide mechanisms for identifying objects based on a social context of the object. In other words, a user of a device who wishes to see, access data from, or control another party's (e.g., another user's) object may be able to identify such objects based on the user's social links, or the relationships the user has established with other parties who own such objects (e.g., such as parties to which the user is connected via a social networking service, like Facebook or LinkedIn). Thus, rather than attempting to decipher a 15-digit IMEI number, in accordance with certain embodiments, the user may instead be able to rely on an identifier that includes not only an identifier of the particular object (such as the IMEI number or object type description), but also on an identifier of the owner of the device.

Turning now to FIG. 1, which provides one example embodiment, a block diagram of a mobile terminal 10 that would benefit from embodiments of the present invention is illustrated. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), sensors, objects, or any combination of the aforementioned, and other types of voice and text communications systems, may readily employ embodiments of the present invention, other devices including fixed (non-mobile) electronic devices may also employ some example embodiments.

As used in the description that follows, the term "object" refers to a smart object or any other physical object that is capable of communicating information to a network, such as the Internet. Such information may include data that is detected or measured by the object (e.g., temperature, humidity, acceleration, etc.), properties of the object (e.g., preferred communication protocols, a state of the object such as active or inactive, battery life, etc.), or any other data received or processed through the object.

Referring again to FIG. 1, the mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 2, which depicts certain elements of an apparatus 50 for identifying objects accessible to a user via the user's social links. The apparatus 50 of FIG. 2 may be employed, for example, with the mobile terminal 10 of FIG. 1. However, it should be noted that the apparatus 50 of FIG. 2 may also be employed in connection with a variety of other devices, both mobile and fixed, such as a server as described below, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, part or all of the apparatus 50 may be on a fixed device such as a server or other service platform and the content may be presented (e.g., via a server/client relationship) on a remote device such as a user terminal (e.g., the mobile terminal 10) based on processing that occurs at the fixed device.

Figure 2:
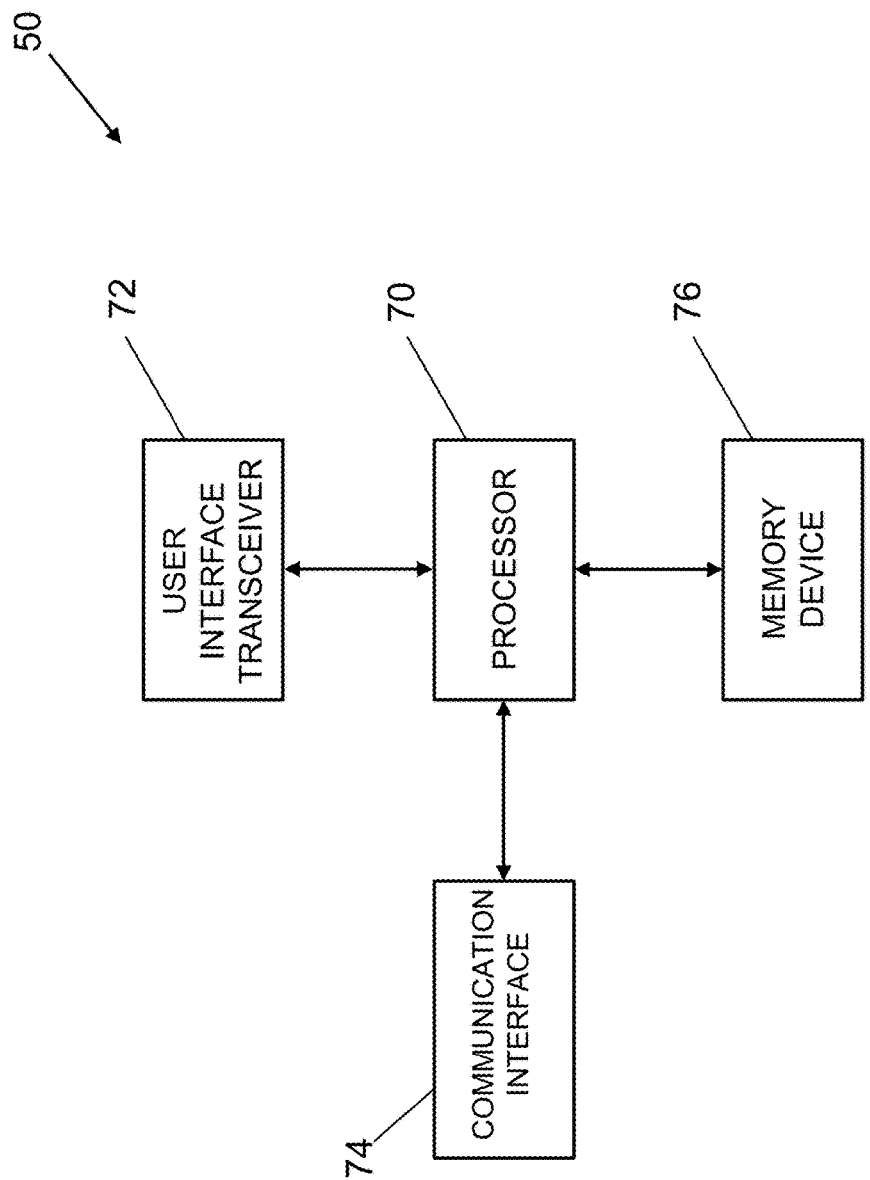
FIG. 2 illustrates a schematic block diagram of an apparatus for identifying objects accessible to a user via the user's social links according to an example embodiment of the present invention.

It should also be noted that while FIG. 2 illustrates one example of a configuration of an apparatus 50 for identifying objects accessible to a user via the user's social links, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for identifying objects accessible to a user via the user's social links may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories.

In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

Embodiments of the invention will now be described with reference to FIG. 3. An individual may be the owner of an object 100, such as a mobile terminal, a tablet, a motion sensor, a temperature sensor, a pollution sensor, etc. For purposes of explanation and clarity, the owner of the object 100 is referenced herein as a "party." The object 100, shown in FIG. 4, may comprise at least a sensor 105 or other component configured to detect or receive information, and a communication interface 110 configured to at least transmit the information to a network 170 (such as the Internet). In some cases, the object 100 may be a very simple structure that is only configured to measure a particular parameter (such as temperature) and transmit the measured values to the network 170, where the values may be stored, analyzed, manipulated, etc. In other cases, however, the object 100 may include its own memory device 115, a processor (not shown), a user input transceiver (not shown), user input devices (not shown), etc., such as when the object is, for example, a mobile terminal such as the mobile terminal 10 shown in FIG. 1. Thus, in some cases, the sensor 105 may be embodied by one or more of the processor (not shown), user input devices (not shown), etc., such that the information transmitted to the network 170 via the communication interface 110 may comprise data received via the user input devices and/or processed by the processor.

Figure 3:
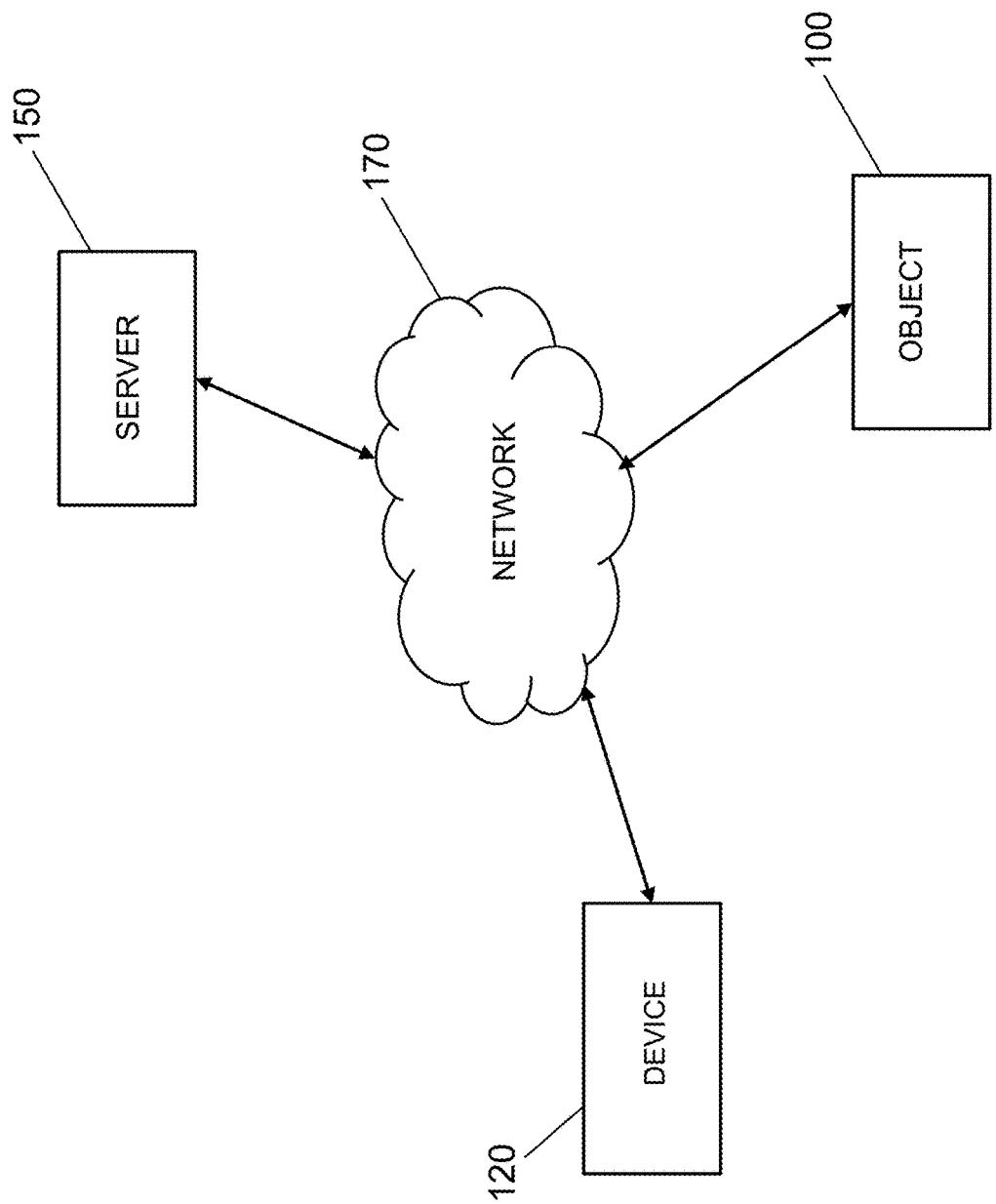
FIG. 3 illustrates a system for identifying objects accessible to a user via the user's social links according to an example embodiment of the present invention.
Figure 4:
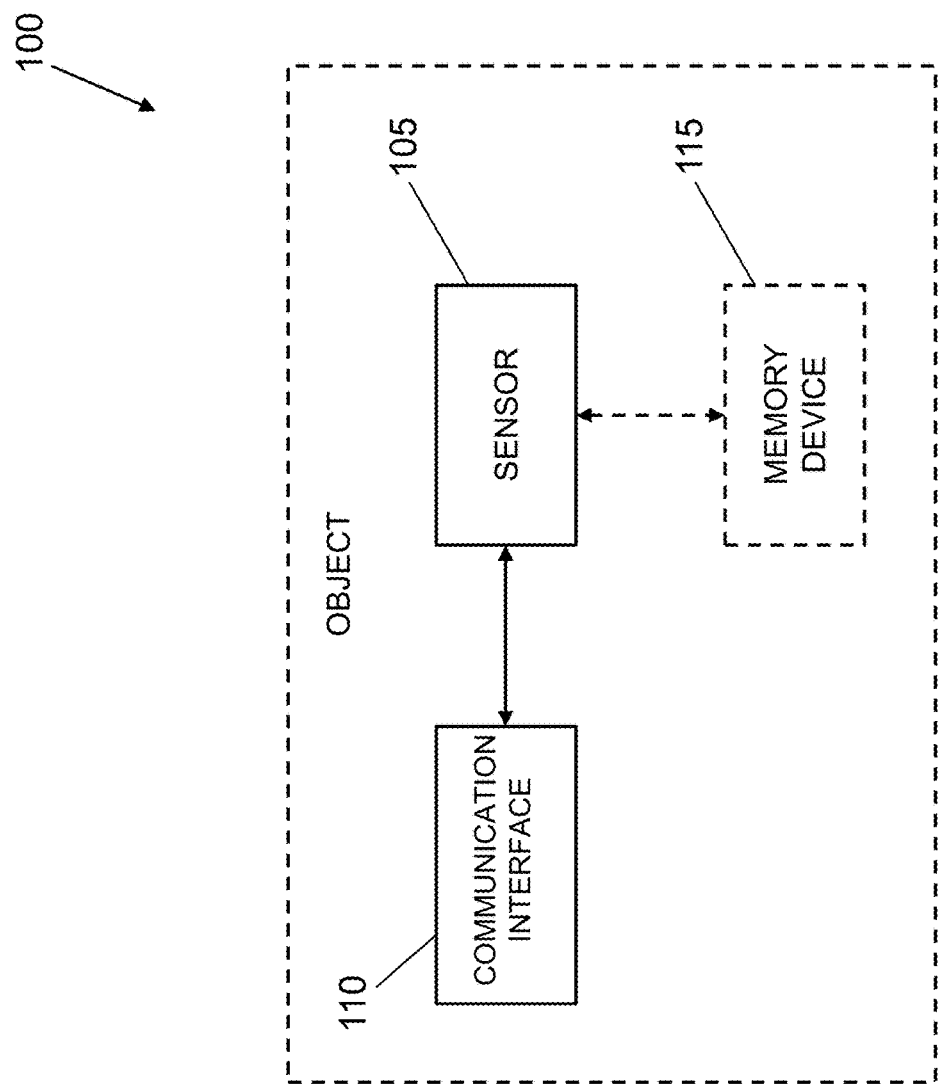
FIG. 4 illustrates a schematic block diagram of an object according to an example embodiment of the present invention.

With continued reference to FIG. 3, a user of a device 120 may be interested in discovering objects 100 to which the user may have access. For example, the user may want to view the information obtained by a particular object 100 (e.g., "view" access), download such information for use by the user (e.g., "read" access), and/or transmit his own information to the object (e.g., "write" access), such as to provide the object with a new rule set for gathering information or otherwise manipulating or changing information stored in the object, including reconfiguring the object or executing an operation via the object.

A party who owns an object 100 may, however, wish to limit the number of people who have access to the object, or at least restrict the type of access granted. Accordingly, each object 100 may be associated with access control information that specifies which users have "view" access, which have "read" access, and which have "write" access.

As noted above, in conventional systems, the process of discovering objects to which a user has some type of access generally involves identifying an object based on a unique object identifier and without any regard to who owns the object or the relationship of the party owning the object to the user seeking access to the object. Such conventional object identifiers are typically very technical list user interfaces based on radio proximity (e.g., medium access control (MAC) address scans or access point names), as noted above.

Accordingly, embodiments of the invention provide mechanisms for leveraging a user's social links to discover and access objects. For example, in the context of the Facebook® social networking service, a user's social links may be the relationship with the "friends" the user has defined. Referring again to FIG. 2, embodiments of the invention provide an apparatus 50 that may be embodied by the mobile terminal 10 of FIG. 1 (e.g., a cellular phone) or a server (e.g., a social networking site server or third party application server) that has or is otherwise associated with a display 28, such as a touch screen display (e.g., a server that is in communication with a mobile terminal having a display).

Figure 5:
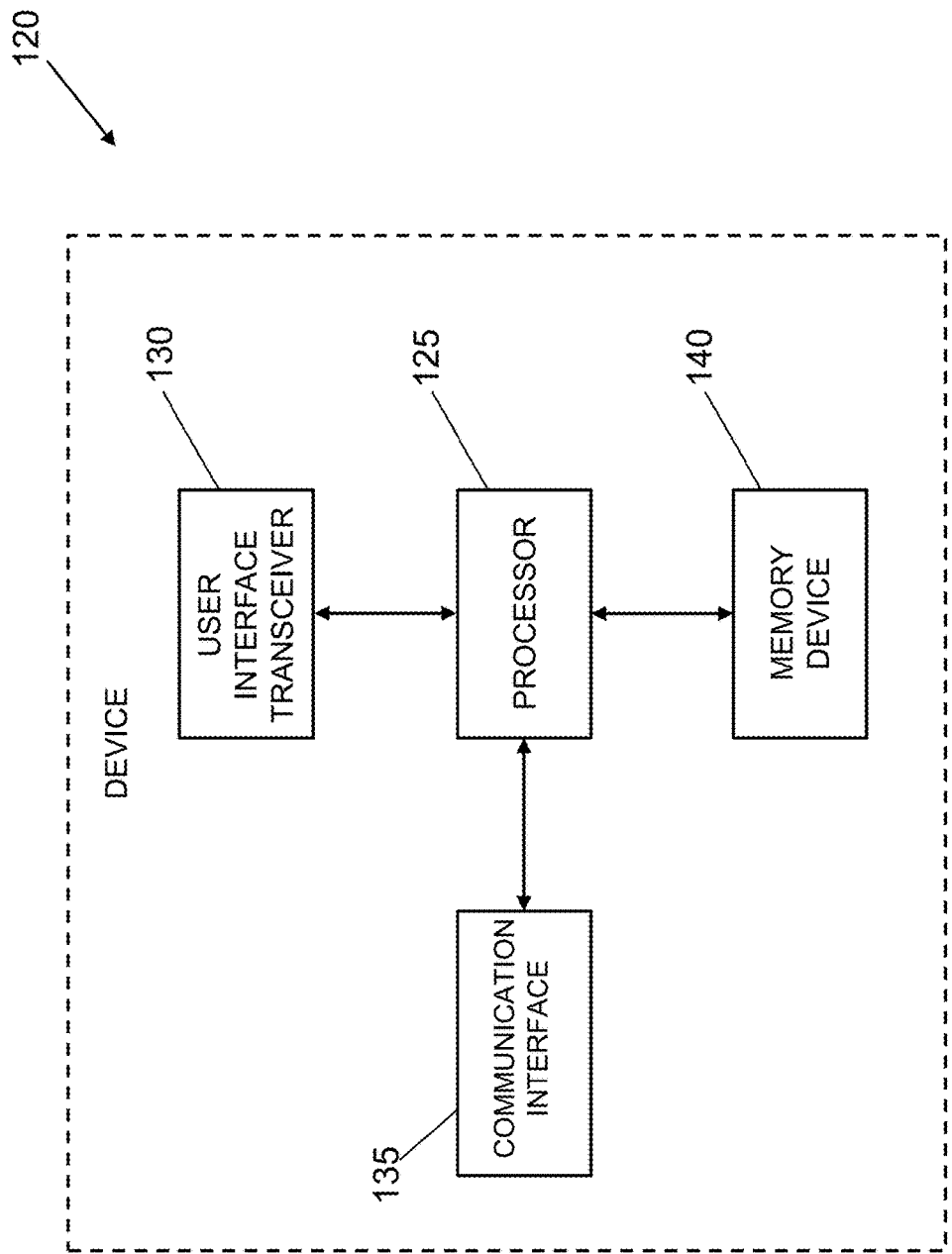
FIG. 5 illustrates a schematic block diagram of a device according to an example embodiment of the present invention.

As described above, the apparatus 50 may comprise at least one processor 70 and at least one memory 76 including computer program code. The at least one memory 76 and the computer program code may be configured to, with the processor 70, cause the apparatus 50 to at least access a social link associated with a user of a device 120, identify an object 100 via the social link, wherein the object is connected to a network 170, and provide for presentation of an indication of the object on a display of the device. The object 100 is described above and illustrated in FIG. 4. The device 120 is illustrated in FIG. 5 and may include a processor 125, a user interface transceiver 130, a communication interface 135, and a memory device 140, which (in some cases) may be the same or similar to the processor 70, user interface transceiver 72, communication interface 74, and memory device 76 described above with respect to FIG. 2, such as when the user's device 120 is the mobile terminal 10 shown in FIG. 1 or when the apparatus 50 is embodied by the device 120.

Figure 6:
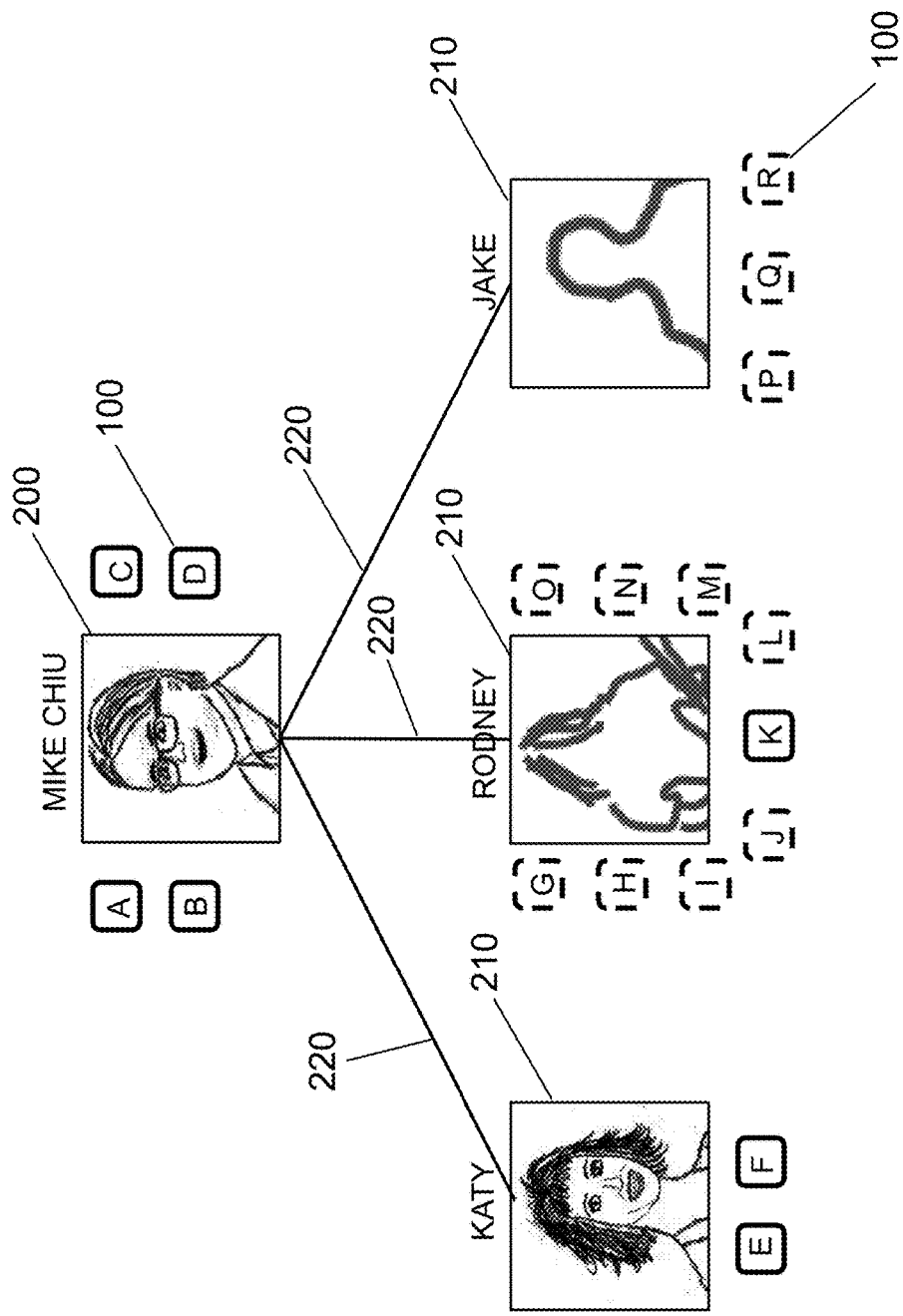
FIG. 6 illustrates a user's social links and the respective objects according to an example embodiment of the present invention.

With reference to FIG. 6, an example is depicted in which a user 200 (Mike Chiu) wishes to discover objects 100 owned by parties 210 to which that user has some type of access. Although some parties may grant view, read, or write access indiscriminately to all users (including, in this example, Mike Chiu), in this example Mike Chiu is only interested in discovering objects 100 to which he has access, where the objects are owned by parties 210 with which Mike has a social link 220 (referenced herein as "related parties"), such as parties 210 that have been defined by at least Mike or the party as a "friend."

FIG. 6 illustrates that, in this example, the user 200 Mike is a user of four devices, labeled "A," "B," "C," and "D." Mike has social links 220 with three people: Katy, Rodney, and Jake. Thus, Katy, Rodney, and Jake are related parties 210 with respect to the user 200 Mike. Each of Mike's related parties 210 is an owner of an object 100 (labeled "E" through "R"). Some of the objects 100 owned by the related parties 210 are associated with access control information (e.g., defined by the respective party) that gives Mike some sort of access (e.g., view, read, or write access), shown in solid lines, whereas other objects 100 owned by the related parties 210 are associated with access control information that does not grant Mike any type of access, shown in dashed lines. For example, the related party 210 Katy is the owner of two objects ("E" and "F") and has provided the user Mike with access to both. Rodney, on the other hand, owns nine objects ("G" through "O") but has only decided to grant Mike access to one object "K," and Jake owns three objects ("P," "Q," "R") but has not granted access rights to Mike on any of the them.

Embodiments of the invention allow the user 200 to identify an object 100 via the user's social links 210 such that an indication of the object can be presented on a display of the user's device. For example, the at least one memory and the computer program code of the apparatus 50 (shown in FIG. 2) may be configured to, with the processor, cause the apparatus to identify the object 100 by determining a party 210 related to the user 200 via the social link 220 and identifying at least one object associated with the party. The at least one memory and the computer program code may be further configured to, with the processor, cause the apparatus to identify the object 100 by determining whether access control information associated with the object allows for access of the object by the user 200 of the device 120. In the depicted example of FIG. 6, embodiments of the invention may thus access Mike's social links 220 to Katy, Rodney, and Jake and may allow Mike to see that he has access to Katy's objects "E" and "F" and Rodney's object "K."

The social links 220 may be accessed in a variety of ways to discover the objects 100 to which a user 200 has access. For example, the at least one memory and the computer program code of the apparatus 50 (shown in FIG. 2) may be configured to, with the processor, cause the apparatus to access the social link 220 automatically in response to the user's execution of a third party application. For example, turning to FIG. 7, the user of a device 120, such as a mobile terminal, may open a map application to get directions to a particular location, such as 1234 North St. in Big City in the depicted example. The processor 125 of the device (shown in FIG. 5) may, for example, provide for presentation of a map 230 on the display 128 of the device 120 that shows the desired destination (represented by a star). In response to the execution of the third party application (e.g., the map application in the depicted example), the apparatus may be caused to automatically access the user's social links to identify objects.

In the example of a mapping application, objects associated with a location (e.g., via global positioning data from the objects) that is represented on the display 128 may be indicated on the displayed map 230. For example, a marker 240 may be provided on the map 230 at a position corresponding to the object's location. The marker 240 may, in some cases, be labeled to provide information regarding the object or the object's owner (e.g., the party related to the user). For instance, Katy's objects "E" and "F" (shown in FIG. 6) may correspond to Katy's smart phone and Katy's tablet, respectively. Rodney's object "K" may correspond to Rodney's pollution sensor, which he carries with him at all times. Thus, in some cases, the mapping application may label a marker 240 associated with Katy's smart phone "E" as "Katy," recognizing that, as a phone, this object will generally be carried by Katy at all times and will represent Katy's current location. At the same time, Rodney may have associated his pollution sensor "K" with his current location (e.g., by configuring a setting of the pollution sensor or the server 150, shown in FIG. 3, with which the pollution sensor is in communication). Thus, the marker 240 associated with Rodney's pollution sensor "K" may be labeled "Rodney" to represent Rodney's current location.

Figure 8:
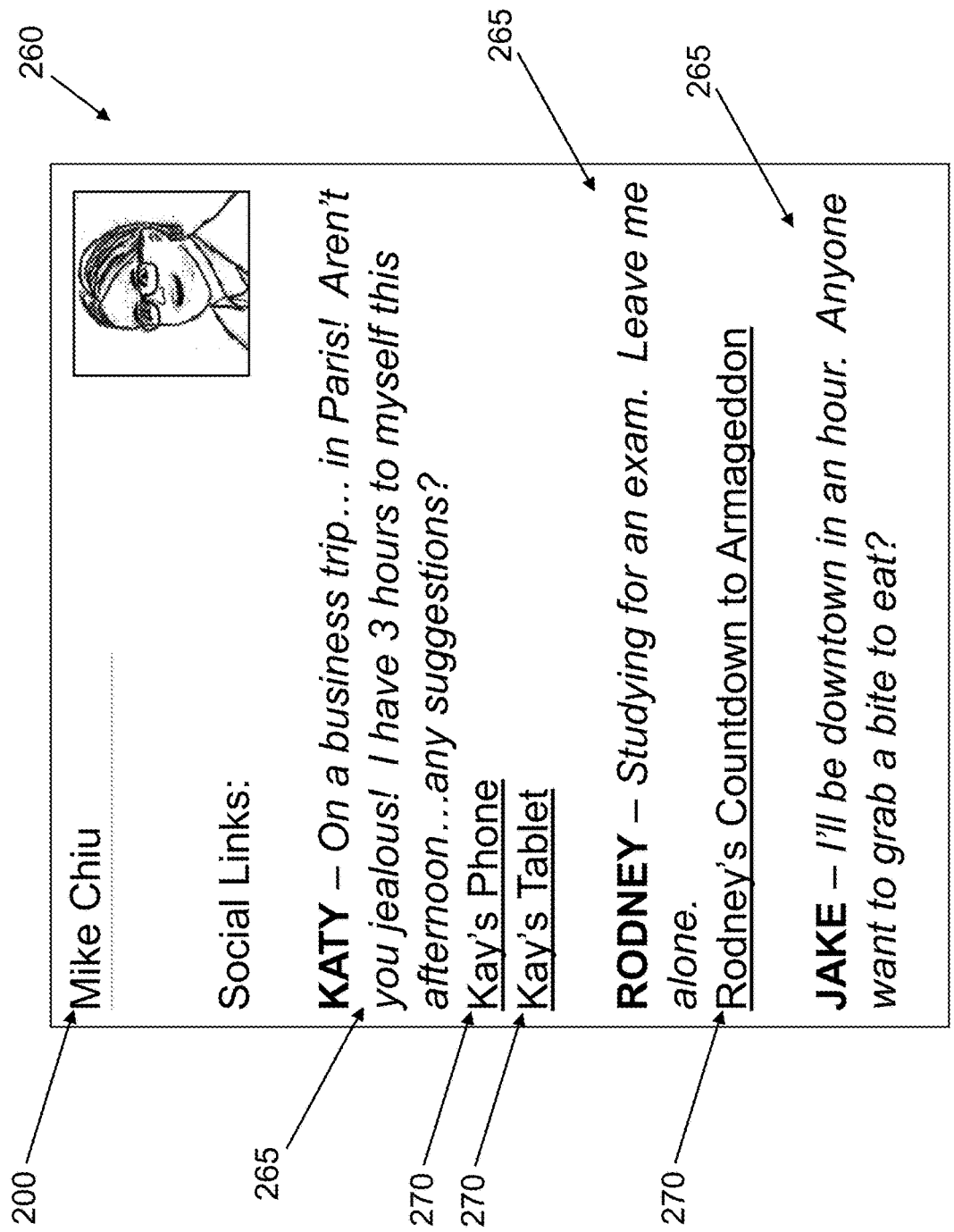
FIG. 8 illustrates a social networking website interface according to an example embodiment of the present invention.

In other cases, the at least one memory and the computer program code may be configured to, with the processor, cause the apparatus to access the social link 220 via a social networking interface. For example, FIG. 8 depicts a social networking interface 260, such as the user Mike's home page on a social networking website (e.g., Facebook®, Twitter®, LinkedIn®, Pinterest®, MySpace®, or other social networking website). The user 200 Mike, in this example, can see posts 265 from each of his three related parties, Katy, Rodney, and Jake. In addition, objects identified via the user's social links and to which the user 200 has some type of access may be indicated on the interface 260, such as via identifiers 270 for each object.

Thus, in the example shown in FIG. 8, identifiers 270 may be provided for Katy's phone (e.g., object "E" of FIG. 6) and Katy's tablet (object "F"), as well as for Rodney's pollution sensor (object "K"). The identifiers 270 may include an identification of the party who owns the device (e.g., "Rodney"), in addition to a description of the particular object (e.g., phone, tablet, etc.). The identification of the party may, for example, be the party's name, a screen name (e.g., a screen name used on the social networking website), or some other name that the user may define for associating himself with the object. Similarly, the description of the particular object may be a default term that is determined based on the object type, or it may be predefined by the party. In the case of Katy's objects, for example, default terms are used to describe the objects in the identifiers 270. For Rodney's pollution sensor, however, Rodney has chosen to describe this object as "Countdown to Armageddon."

As another example, the objects 100 to which a user 200 has access may be discovered within the context of a control application. A control application, such as the application If This Then That (IFTTT), may be used by the user to select objects to which the user has access as either a trigger or an action in a "recipe." An example of a "recipe" could be turning on a specific light if a specific motion detector detects movement, or sending an email if the motion detector detects movement. Embodiments of the invention may thus be used as a mechanism for selecting the objects for such recipes. For example, if a user's IFTTT account is connected to a social networking service, such as Facebook®, when a user searches for a device to use as a trigger or an action in a recipe, the user could be presented with a list of objects to which the user has access that are discovered via the user's social links, as described above.

Figure 7:
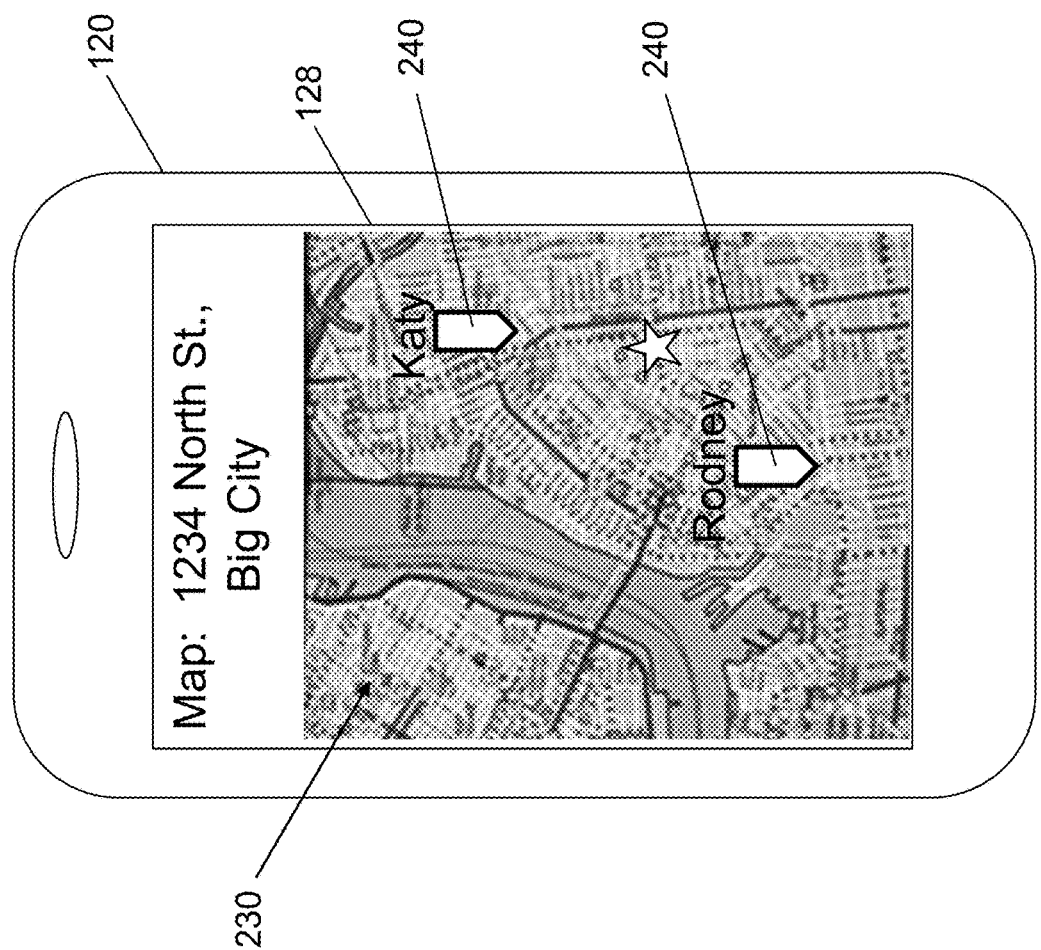
FIG. 7 illustrates a map application according to an example embodiment of the present invention.

As depicted in FIGS. 7 and 8, an indication of the object that is identified via the social link can be presented in different ways depending on the context (e.g., social networking interface versus third party application interface) and/or the type of access that the party grants to the user. In some embodiments, the at least one memory and the computer program code may be configured to, with the processor, cause the apparatus to provide for presentation of the indication by providing for presentation of a visual representation of the object. In FIG. 7, for example, the visual representation of the object is the corresponding marker 240. In FIG. 8, the visual representation of the object is the identifier 270.

In cases where the user may be able to view or download the data detected by the object, but may not be able to change or otherwise control the object (e.g., may not be allowed to change the data, add to it, delete it, use it, or otherwise manipulate it), the at least one memory and the computer program code may be configured to, with the processor, cause the apparatus to provide for presentation of the indication by providing for presentation of data associated with the object. For example, in FIG. 7, the marker 240 may be interactive, such that the user (Mike) of the device 120 may be able to select the marker 240 to view data associated with the object. In the depicted example, for instance, Mike may select the marker 240 labeled "Katy" to view Katy's GPS coordinates, her speed of travel, or other data detected by her phone or that she chooses to share with Mike. Such data may be presented as an overlay to the map 230 in the third party (in this case, map) application, in a new window within the application, or by opening a new application. In a similar fashion, in FIG. 8, the identifiers 270 may be provided as interactive selectable elements that, when selected, allow the user to view the data associated with the object. For example, the identifiers 270 in the depicted example may be hyperlinks that, when selected, navigate the user to a new webpage to view the data associated with the object. The user Mike in this example may, for instance, select "Rodney's Countdown to Armageddon" to navigate to a webpage that shows pollution data, trends, etc. from Rodney's pollution sensor.

In still other embodiments, the at least one memory and the computer program code may be configured to, with the processor, cause the apparatus to provide for presentation of the indication by enabling control of the object by the user of the device. For example, Katy may have granted Mike access to control (e.g., make use of functionality provided by) her tablet. As noted above, such access may be specified in the access control information for that object. In this example, with reference to FIG. 8, upon selecting the identifier 270 for Katy's Tablet, Mike may be able to view a list of applications on Katy's tablet computer and select one or more applications to run (e.g., an application that Mike may not otherwise have access to using his own devices). As another example, a party may own an object, such as an indoor lighting system for the party's house, and the party may grant a user (e.g., his father-in-law) access to control that object. For example, the user (e.g., the father-in-law) may, through a mechanism similar to what is described in the examples depicted in FIGS. 7 and 8, be allowed to turn on or off the lights inside the party's house, or may be allowed to configure rules associated with the object for what times the lights should automatically be turned on or off.

Embodiments of the invention described above may be used in various contexts on various types of smart objects. As an example, a husband and wife may each have a ring with a button for receiving user input and a light emitting diode (LED) for providing output. Using embodiments of the invention described above, the husband and wife can identify each other's rings and can allow each other much access to the other person's respective ring. In doing so, they may configure the objects such that when the husband presses the button on his own ring, the LED on his wife's ring lights up. Likewise, the objects may be configured such that when the wife presses the button on her own ring, the LED on her husband's ring light up. In this way, the lighting of the other's LED may be a special message shared between the husband and wife, such as a "just thinking of you," or the couple might develop other, richer communication practices, such as requesting the urgent attention of the other, depending on, for example, the frequency, duration, and/or timing of the LED lighting.

Figure 9:
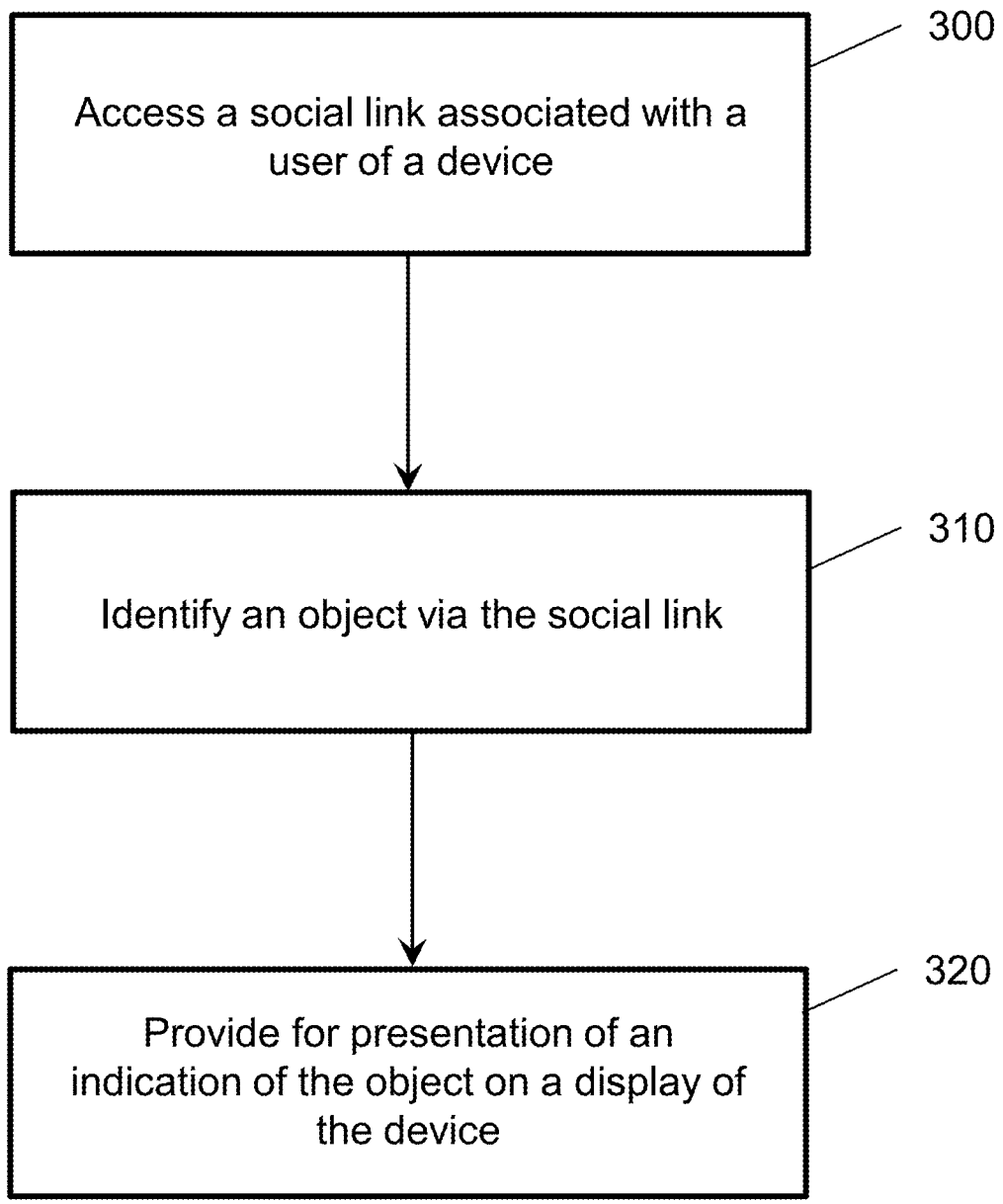
FIG. 9 illustrates a flowchart of methods of identifying objects accessible to a user via the user's social links according to an example embodiment of the present invention.

FIG. 9 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for identifying objects accessible to a user via the user's social links is shown in FIG. 9. FIG. 9 depicts an example embodiment of the method that includes accessing a social link associated with a user of a device at block 300, identifying an object via the social link, where the object is connected to a network as described above, at block 310, and providing for presentation of an indication of the object on a display of the device at block 320.

In some cases, accessing a social link may comprise accessing the social link automatically in response to the user's execution of a third party application or via a social networking interface, as described above. Moreover, a party related to the user may be determined via the social link and at least one object associated with the party may be identified as part of identifying the object.

In identifying the object, a determination may be made in some embodiments as to whether access control information associated with the object allows for access of the object by the user of the device. In this regard, as noted above, providing for presentation of an indication of the identified object may include providing for presentation of a visual representation of the object, providing for presentation of data associated with the object, and/or enabling control of the object by the user of the device.

In some embodiments, certain ones of the operations above may be modified or further amplified as described below. Furthermore, in some embodiments, additional optional operations may be included, some examples of which are shown in dashed lines in FIG. 9. Modifications, additions, or amplifications to the operations above may be performed in any order and in any combination.

In an example embodiment, an apparatus for performing the methods of FIG. 9 above may comprise a processor (e.g., the processor 70 of FIG. 2) configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300, 310 may comprise, for example, the communication interface 74, the processor 70, the memory device 76, and/or a device or circuit for executing instructions or executing an algorithm for processing information as described above. Examples of means for performing operation 320 may comprise, for example, the user interface transceiver 72, the processor 70, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the depicted embodiments show a user with social links to three related parties, it is understood that a user may have social links to numerous parties, and those parties may own one or more or (in some cases) no objects to which they grant the user access. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   access, from a device of a first user, a social link associated with a second user via a social networking service, wherein the social link is between the first user and the second user;
   identify access control information associated with an object, wherein the object is associated with the second user and accessible to the first user based on the social link,
   determine whether the access control information associated with the object allows for access and control of the object by the first user of the device based on the social link;
   provide for presentation of a representation of the object having a first indicia or a second indicia, wherein the first indicia indicates permitted access and control of the object to the first user of the device through the social link provided by the second user, wherein the second indicia, different from the first indicia, indicates denied access and control of the object to the first user of the device through the social link provided by the second user; and
   enable control of functionality provided by the object to the first user of the device, wherein the control of functionality is based on rules associated with the object configured by the second user.

2. The apparatus of claim 1, wherein the at least one memory and the computer program code are further configured to, with the processor, cause the apparatus to automatically access the social link via a social networking interface.

3. The apparatus of claim 1, wherein the at least one memory and the computer program code are configured to, with the processor, cause the apparatus to identify the object by determining the second user related to the first user via the social link and identifying at least one object associated with the second user.

4. The apparatus of claim 1, wherein the at least one memory and the computer program code are configured to, with the processor, cause the apparatus to provide for presentation of the representation of the object by providing for presentation of data associated with the object.

5. The apparatus of claim 1, wherein the at least one memory and the computer program code are configured to, with the processor, cause the apparatus to provide for presentation of the representation of the object by enabling control of the object by the first user of the device.

6. The apparatus of claim 1, wherein the at least one memory and the computer program code are configured to, with the processor, cause the apparatus to receive data associated with the object in response to receipt of the first user input via the first indicia or a second indicia presented.

7. The apparatus of claim 6, wherein the received data associated with the object comprises other data detected by the object and presented as an overlay on a user interface of a third party location service.

8. The apparatus of claim 1, wherein the access of the object is determined within a context of an If This Then That (IFTT) based application program.

9. The apparatus of claim 1, wherein the object comprises a temperature sensor configured to detect a temperature proximate the object, a motion sensor configured to detect a presence of one or more other objects, or a pollution sensor configured to measure air quality and extent of pollution in an environment of the object.

10. The apparatus of claim 1, wherein the object's access control information is set to limit the number of users who have access to the object or specifies which users have view access, read access, or write access through the social link.

11. The apparatus of claim 1, wherein the first indicia and the second indicia each comprises a particular visual indicia.

12. A method comprising:
   accessing, from a device of a first user, a social link associated with a second user of the device via a social networking service, wherein the social link is between the first user and the second user;
   identifying, using the processor, access control information associated with an object, wherein the object is associated with the second user and accessible to the first user based on the social link;
   determining whether the access control information associated with the object allows for access and control of the object by the first user of the device based on the social link;
   providing for presentation of a representation of the object having a first indicia or a second indicia, wherein the first indicia indicates permitted access and control of the object to the first user of the device through the social link provided by the second user, wherein the second indicia, different from the first indicia, indicates denied access and control of the object to the first user of the device through the social link provided by the second user; and
   enabling control of functionality provided by the object to the first user of the device, wherein the control of functionality is based on rules associated with the object configured by the second user.

13. The method of claim 12, wherein providing the representation of the object comprises enabling control of the object by the user of the device.

14. The method of claim 12 further comprising:
   receiving data associated with the object in response to receipt of user input via the first indicia or second indicia presented, wherein the received data associated with the object comprises other data detected by the object and presented as an overlay on a user interface of a third party location service.

15. The method of claim 12, further comprising:
   automatically accessing the social link via a social networking interface.

16. A computer program product comprising at least one non-transitory computer-readable storage medium having computer-executable program code portions stored therein, the computer-executable program code portions comprising program code instructions for:
   accessing, from a device of a first user, a social link associated with a second user of the device via a social networking service, wherein the social link is between the first user and the second user;
   identifying access control information associated with an object, wherein the object is associated with the second user and accessible to the first user based on the social link;

determining whether the access control information associated with the object allows for access and control of the object by the first user of the device based on the social link;

providing for presentation of a representation of the object having a first indicia or a second indicia, wherein the first indicia indicates permitted access and control of the object to the first user of the device through the social link provided by the second user, wherein the second indicia, different from the first indicia, indicates denied access and control of the object to the first user of the device through the social link provided by the second user; and enabling control of functionality provided by the object to the first user of the device, wherein the control of functionality is based on rules associated with the object configured by the second user.

17. The computer program product of claim 16 further comprising program code instructions for enabling control of the object by the first user of the device.

18. The computer program product of claim 16 further comprising program code instructions for receiving data associated with the object in response to receipt of the first user input via the first indicia or second indicia presented.

19. The computer program product of claim 18, wherein the received data associated with the object comprises other data detected by the object and presented as an overlay on a user interface of a third party location service.

20. The computer program product of claim 16 further comprising program code instructions for automatically accessing the social link via a social networking interface.

21. The computer program product of claim 16, wherein the at least one memory and the computer program code are configured to, with the processor, further cause the apparatus to control the object in response to receipt of the first user input via the first indicia presented.

* * * * *